US010092863B1

(12) United States Patent
George et al.

(10) Patent No.: US 10,092,863 B1
(45) Date of Patent: Oct. 9, 2018

(54) WATER COOLING SYSTEM FOR MARINE DRIVE

(71) Applicant: Brunswick Corporation, Lake Forest, IL (US)

(72) Inventors: Trevor George, Eldorado, WI (US); Amir Abou-Zeid, Waupun, WI (US); Daniel Rothe, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 299 days.

(21) Appl. No.: 14/947,369

(22) Filed: Nov. 20, 2015

(51) Int. Cl.
| | | |
|---|---|---|
| *B01D 21/02* | (2006.01) | |
| *F01P 3/20* | (2006.01) | |
| *B63H 20/28* | (2006.01) | |
| *B63H 21/38* | (2006.01) | |
| *C02F 1/00* | (2006.01) | |
| *B01D 21/00* | (2006.01) | |
| *C02F 103/02* | (2006.01) | |

(52) U.S. Cl.
CPC ......... *B01D 21/10* (2013.01); *B01D 21/0042* (2013.01); *B01D 21/0087* (2013.01); *B63H 20/28* (2013.01); *B63H 21/383* (2013.01); *C02F 1/00* (2013.01); *F01P 3/202* (2013.01); *C02F 2001/007* (2013.01); *C02F 2103/023* (2013.01)

(58) Field of Classification Search
CPC .... F01P 3/20; F01P 3/202; F01P 3/205; F01P 11/06; F01P 2011/061; F01P 2050/02; F01P 2050/04; F01P 2050/12; B63H 20/28; B63H 20/285; B63H 21/383; B63H 21/38; F02B 61/045; B63B 2770/00; B01D 21/10; B01D 21/0039; B01D 21/0042; B01D 21/0087; B01D 21/2427; B01D 21/24; B01D 21/2405; B01D 21/245; C02F 1/00; C02F 2001/007; C02F 2103/023
USPC .... 440/88 C, 88 R, 88 L, 88 N, 88 M, 88 K, 440/88 HE
See application file for complete search history.

(56) References Cited

U.S. PATENT DOCUMENTS

| | | | | |
|---|---|---|---|---|
| 3,147,221 | A * | 9/1964 | Johnston ............ | B01D 21/0042 210/519 |
| 4,122,009 | A * | 10/1978 | Tao ........................ | B01D 17/00 210/708 |
| 4,790,882 | A * | 12/1988 | Barres ..................... | F01P 11/06 123/41.21 |
| 6,289,853 | B1 * | 9/2001 | Walczak ............... | F02B 61/045 123/25 C |
| 6,551,154 | B1 | 4/2003 | Jaszewski et al. | |
| 8,133,087 | B1 | 3/2012 | Abou Zeid et al. | |
| 8,177,975 | B2 * | 5/2012 | Schipper ............ | B01D 19/0005 210/180 |
| 8,696,397 | B2 | 4/2014 | Langenfeld et al. | |

(Continued)

*Primary Examiner* — David C Mellon
(74) *Attorney, Agent, or Firm* — Andrus Intellectual Property Law, LLP (57) ABSTRACT

A filter for a water cooling system in a marine drive includes a cavity having an upper side and a lower side, a water inlet that delivers a water flow into the cavity, and a water outlet that delivers water out of the cavity. The flow velocity of water within the cavity is low such that heavy debris sinks toward the lower side of the cavity and buoyant debris floats toward the upper side of the cavity. An upper debris outlet expels the buoyant debris out of the cavity and a lower debris outlet expels the heavy debris out of the cavity.

20 Claims, 7 Drawing Sheets

(56) References Cited

U.S. PATENT DOCUMENTS

| | | | |
|---|---|---|---|
| 9,005,455 B2 * | 4/2015 | Achard | B01D 21/265 |
| | | | 209/155 |
| 2009/0130928 A1 | 5/2009 | Taylor et al. | |
| 2009/0318039 A1 * | 12/2009 | Hays | F01P 11/029 |
| | | | 440/88 C |
| 2012/0175318 A1 * | 7/2012 | Zaanen | B01D 21/0045 |
| | | | 210/790 |

* cited by examiner

WATER COOLING SYSTEM FOR MARINE DRIVE

FIELD

The present invention generally relates to a cooling system for a marine drive that intakes water from a body of water surrounding the marine drive and circulates the water in order to cool one or more heat emitting portions of the marine drive. More particularly, the present invention relates to such a water cooling system having a filter configured to move debris from the water circulated through the system.

BACKGROUND

The following U.S. patents and patent applications are hereby incorporated by reference in their entirety.

U.S. Pat. No. 8,133,087 discloses an outboard motor cooling water distribution system that directs water from the water jacket of an engine through a container in which a conduit has a first inlet opening that is configured to cause a water stream to entrain debris from a region near a drain opening of the container and prevent the debris from building up in the vicinity of the drain opening. Debris which is heavier than the water is drawn upwardly through the first inlet opening of the conduit and conducted away from the container. Debris which is lighter than water is entrained in a second water flow and conducted through a second inlet opening of the conduit so that it can be drawn into the conduit and conducted away from the container. The creation of the first water flow maintains the area around the drain opening in a clean condition as a result of the velocity and direction of the water flow caused by the position and size of the first inlet opening of the conduit. The primary function of the present invention is to prevent a buildup of debris in the area around the drain opening and the potential blockage of the drain opening that could result from that type of buildup.

U.S. Pat. No. 6,551,154 discloses a tell-tale system for an outboard motor in which the tell-tale fluid conduit is connectable to an external water source, such as a water hose, and is extendable away from the cowl of the outboard motor in order to facilitate its use during a flushing operation. When not being used in the flushing procedure, the connector of the fluid conduit is snapped into position in connection with the cowl to maintain its position when used as a tell-tale port.

U.S. Pat. No. 8,696,394 discloses a marine propulsion system comprising an internal combustion engine, a cooling circuit carrying cooling fluid that cools the internal combustion engine, a sump holding oil that drains from the internal combustion engine, and a heat exchanger receiving the cooling fluid. The oil that drains from the internal combustion engine to the sump passes through and is cooled by the heat exchanger.

U. S. Patent Application No. 2009/0130928 discloses a cooling system for a marine engine having a turbocharger that provides a flow of coolant through heat emitting objects prior to flowing through a coolant jacket of the turbocharger itself. This avoids the potentially disadvantageous circumstance of directing cold water directly from a body of water through the cooling jacket of the turbocharger. Both open loop and closed loop versions of the invention are illustrated and described.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a filter for a water cooling system in a marine drive includes a cavity having an upper side and a lower side, a water inlet that delivers an inlet flow into the cavity, and a water outlet that delivers a filtered water flow out of the cavity. The flow velocity of water within the cavity is low such that heavy debris sinks toward the lower side of the cavity and buoyant debris floats toward the upper side of the cavity. An upper debris outlet expels the buoyant debris out of the cavity and a lower debris outlet expels the heavy debris out of the cavity.

One embodiment of a water cooling system for a marine drive has a filter and a pump. The filter has a cavity with an upper side and a lower side, a first side and a second side. The filter has a water inlet and a water outlet. The filter further has a lower debris outlet in a lower portion of the cavity and an upper debris outlet in an upper portion of the cavity. A pump is connected in fluid communication with the water inlet or the water outlet that causes water to flow through the cavity of the filter from the water inlet to the water outlet at a flow velocity. The flow velocity is low such that heavy debris in the inlet flow sinks toward the lower side of the cavity and is expelled out of the lower debris outlet, and buoyant debris in the inlet flow floats toward the upper side of the cavity and is expelled out of the upper debris outlet.

Various other features, objects and advantages of the invention will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
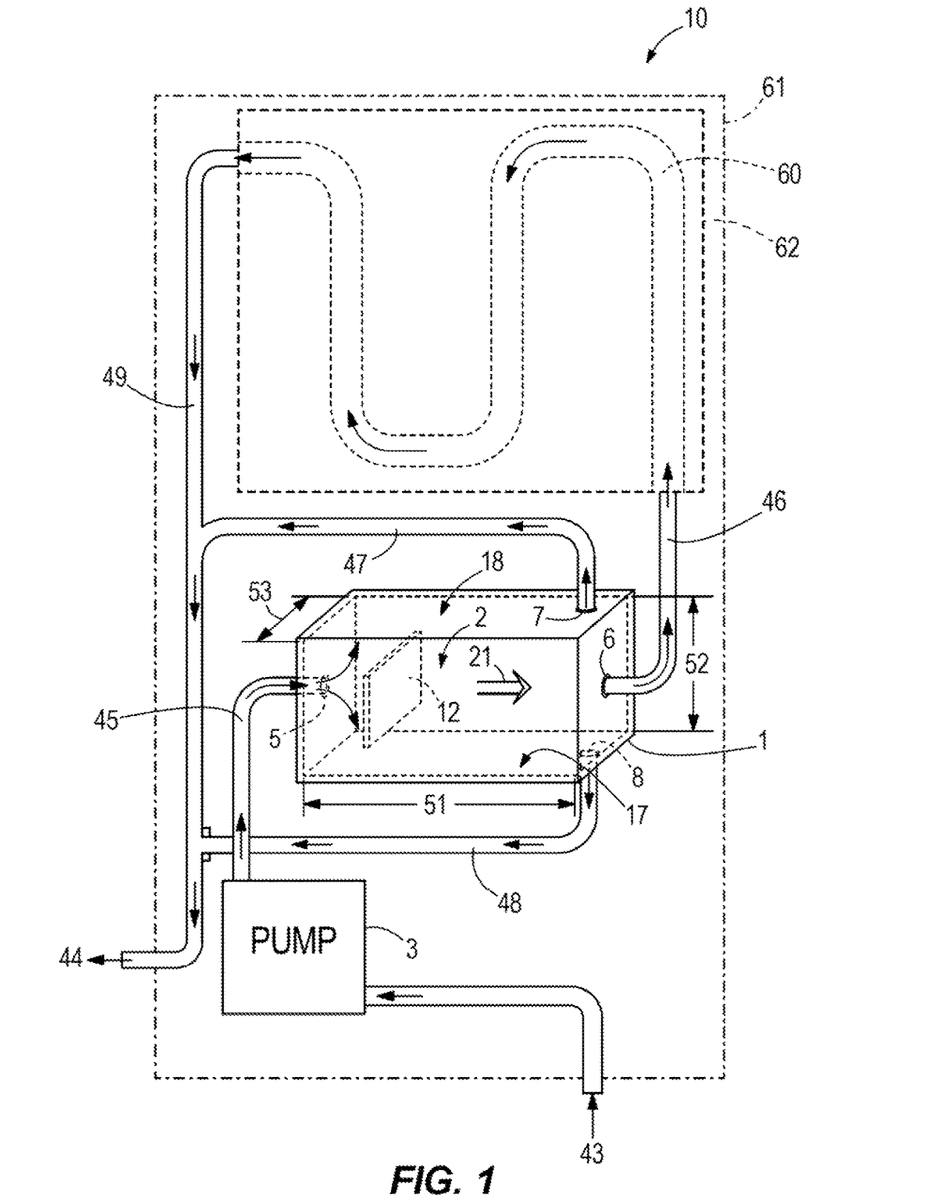
FIG. 1 is a schematic depiction of one embodiment of a cooling system for a marine drive according to the present disclosure.

FIG. 1 provides a schematic depiction of one embodiment of a water cooling system 10 for a marine drive 61 that sucks in water from the body of water surrounding the marine drive 61 through intake 43, circulates the water through the cooling system 10 via pump 3 in order to absorb heat from heat-emitting portions of the marine drive, and specifically portions of the internal combustion engine 62 in the marine drive 61. The water absorbs heat from the heat emitting portions of the marine drive and then is expelled out of the water cooling system 10 through system output 44 and back into the surrounding body of water.

As water surrounding the marine drive often contains debris, including buoyant debris (such as aquatic grasses, hay, leaves, and wood) and heavy debris (such as sand and seashells), such debris often gets sucked into the cooling system. Through their experimentation and research in the relevant field, the inventors recognized that this debris may have a tendency to get stuck at various points in the cooling system, and the collection of debris often causes decreased flow of water through the cooling system and/or a complete blockage of water flow. This decreases the effectiveness of the cooling system and can lead to problems, such as overheating and increased wear on the engine. Some marine drives utilize mesh or porous filtering devices and related techniques to strain out debris from the water circulated and/or avoid the intake of debris into the cooling system. For example, such mesh or porous filtering devices may be placed at the water intake of the cooling system, aiming to strain debris out of the water entering the system. However, such filters are not able to eliminate all types and sizes of debris, and thus some debris does still enter the system and can eventually collect and cause clogs within the system. Furthermore, these mesh or porous filters may be undesirable because they often become clogged with debris and require regular maintenance in order to clear the debris from the filter so that the cooling system can continue to circulate water.

The present inventors have recognized these problems and developed a solution to prevent debris buildup that clogs the cooling system 10 and/or the inlet thereto, which is the filter 1 disclosed herein that removes debris from the system 10. Specifically, the filter 1 includes a cavity 2 having a large enough volume and a sufficient length such that the flow velocity 21 through the cavity 2 from water inlet 5 to water outlet 6 is sufficiently low, and the time of the water in the cavity is sufficient to allow heavy debris in the water to sink toward a lower side 17 and buoyant debris in the water to float toward an upper side 16 of the cavity 2. The heavy debris is then expelled out of the cavity 2 through the lower debris outlet 8, which connects to lower debris hose 48. The heavy debris is then transferred via the lower debris hose 48 to the system output hose 49, and then is flushed out of the system through system output 44. Likewise, the buoyant debris is expelled out of the cavity 2 through the upper debris outlet 7, which connects to the system output hose 49 via the upper debris hose 47. In certain embodiments, the debris hoses 47, 48, as well as the output hose 49, may be oriented in any direction or path required or optimal for carrying the debris out of the system, including in a vertical upward path, assuming that the flow velocity inside the relatively narrow hoses 47, 48, 49 will be high enough to carry the heaviest debris present in the system. Accordingly, debris, including both heavy debris and buoyant debris, is removed from the intake water to the system and a filtered water flow is delivered out of the filter 1. Namely, debris-containing water is pumped in via intake hose 43 and input hose 45, and is then filtered in filter 1 such that water exiting the water output 6 of the filter 1 is substantially free of debris. The filtered water flow exiting the water outlet 6 of the filter 1 is then transported to the cooling water circuit 60 via output hose 46.

Figure 2:
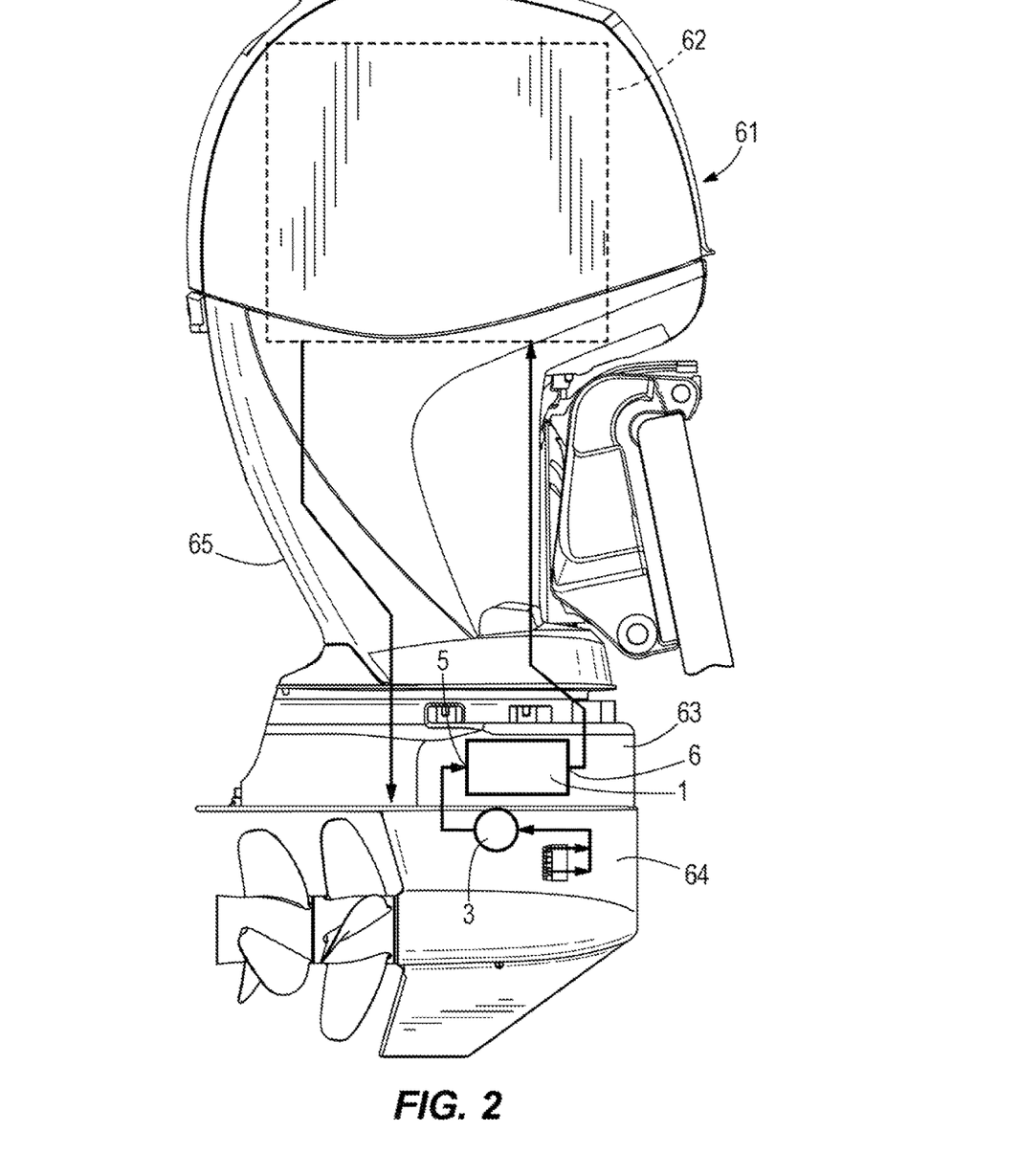
FIG. 2 depicts one embodiment of a water cooling system in a marine drive according to the present disclosure.

The filter 1 may be placed at various locations throughout the cooling system 10, and may be located at any of various locations within the housing of the marine drive 61, or anywhere within the cooling circuit. FIG. 2 depicts one embodiment of an outboard marine drive 61 having a filter 1 located in the drive shaft housing 63, with the filter 1 and pump 3 depicted schematically and overlaid on the exemplary outboard marine drive 61. In the embodiment shown, the pump 3 is located in an upper portion of the gear case 64. In other embodiments, the pump 3 and filter 1 may be situated at other locations within the housing of the marine drive 61. For example, the filter 1 may be located within the engine housing 65, such as at a lower portion thereof. FIGS. 3-7 show various embodiments of filters 1 having various shapes and geometrical configurations. Each of these embodiments includes a cavity 2 having a water inlet 5 that delivers a flow of water into the cavity 2 and a water outlet 6 that delivers filtered water out of the cavity 2. For example, the water inlet 5 may deliver raw water from an exterior body surrounding the marine drive which has been sucked into the inlet 43 of the cooling system 10 via pump 3 which may not have been filtered at all to remove debris. In other embodiments, the water flow through the inlet 5 may have been preliminarily filtered, but debris may still exist in that water flow. For example, heavy debris 30, or debris that sinks (such as rocks, sand, shells), and buoyant debris 32, or debris that floats (such as aquatic grass, wood, hay, leaves), may be sucked into the cooling water supply through the inlet 43. The filter 1 is configured such that heavy debris 30 will sink to a lower side of the filter cavity 2 and buoyant debris 32 will rise to a top side 16 of the filter cavity 2.

A flow diverter 12 may be positioned in the cavity 2 to disperse the water flow from the water inlet 5. Specifically, through their experimentation and research, the inventors recognized that, in some embodiments, a narrow, swift current band developed between the inlet 5 and the outlet 6 of the filter 1 in which the flow velocity did not slow down enough to allow a sufficient amount of debris to be removed by the filter 1. Accordingly, in some embodiments, the flow diverter 12 is inserted in the cavity 2, which may be placed anywhere in the water path between the water inlet 5 and the water outlet 6. For example, the flow diverter 12 may be located closer to the water inlet 5 so that the flow diverter 12 disperses the water flow immediately upon entering the cavity 2. In other embodiments, the flow diverter 12 may be placed closer to a center portion of the cavity 2, or even toward the water outlet 6.

The flow diverter 12 disperses the inlet flow to avoid the development of a fast moving flow path, or jet stream, causing water to travel quickly from the water inlet 5 to the water outlet 6 without sufficiently slowing down such that the heavy debris 30 can sink to the lower side 17 and the buoyant debris 32 can float toward the upper side 16. In the depicted embodiments, the flow diverter 12 causes the water flow from the input to travel toward either the top side 16 or the bottom side 17. Additionally, the filter 1 may comprise one or more debris deflectors 14 adjacent to the water outlet 6 which may be further positioned to avoid fast moving currents within the cavity 2 which may not permit debris separation and filtration.

The cavity 2 has a volume sufficiently large, and the water slowed through use of one or more flow diverters 12 and debris deflectors 14, if necessary, such that the flow velocity 21 within the cavity is low enough to allow debris removal. Depending on the volume of water output from the pump 3 into the filter 1, and also depending on the size of the debris to be removed by the filter 1, the volume of the cavity 2 may be of various sizes. In the embodiment of FIG. 1, the volume of the cavity 2 (which in the embodiment of FIG. 1 is length 51×width 52×depth 53) may be configured such that the flow velocity 21 within the cavity 2 is below a certain critical velocity. For example, through their experimentation and research, the present inventors have recognized that certain critical velocities are required in order to propel debris of certain sizes and weights vertically upward through the cooling system 10. Accordingly, the inventors have recognized that it is desirable to remove heavy debris that will not be propelled sufficiently through the entire cooling system, and thus may settle and build up at certain portions of the cooling system and potentially cause flow issues. Thus, the inventors recognized that, in certain embodiments of the cooling system 10, it is desirable that the flow velocity 21 within the cavity 2 be at least as low, or slower, than the slowest flow velocity within the remainder of the cooling system 10.

The upper and lower debris outlets 7, 8 are sized appropriately such that the openings are large enough to allow debris 30, 32 to be expelled, while minimizing the volume of water lost from the cooling system through the debris outlets 7, 8. In various embodiments, the diameters of the debris outlets 7, 8 are sized based on the largest debris expected to enter the cooling system 10. In one embodiment, the debris outlets 7, 8 have a diameter that is at least as large as the smallest water inlet in the system leading up to the filter 1. In another example, if a straining filter is employed, such as a mesh or porous element at the intake 43, the diameter of the debris outlets 7, 8 may be at least as large as the diameter of the largest pore of the filter. To provide just one specific example, one or both of the debris outlets 7, 8 may have a diameter between 2 mm and 4 mm. In other embodiments the debris outlets 7, 8 may be larger or smaller and may be the same size as one another or may be different sizes.

The inventors conducted research based on stones of specific sizes and weights to represent heavy debris 30 in order to calculate and test the critical velocity required to lift the stones vertically through the cooling system 10. The following table reports the results:

| Size (radius) mm | Buoyancy force in water (N) | mass of stone ball (kg) | weight of stone ball (N) | Weight in water (N) | Critical Velocity (m/s) |
| --- | --- | --- | --- | --- | --- |
| 1 | 0.00004 | 0.00001 | 0.00012 | 0.00007 | 0.34 |
| 2 | 0.00033 | 0.00009 | 0.00092 | 0.00059 | 0.49 |
| 3 | 0.00111 | 0.00032 | 0.00311 | 0.00200 | 0.59 |
| 4 | 0.00263 | 0.00075 | 0.00736 | 0.00474 | 0.69 |
| 5 | 0.00513 | 0.00147 | 0.01438 | 0.00925 | 0.77 |
| 6 | 0.00887 | 0.00253 | 0.02485 | 0.01598 | 0.84 |

These critical velocity values pertain to lifting the heavy debris vertically upwards, and thus they apply to filters 1 that are vertically oriented such that the water outlet 6 is on an upper portion 56 of the cavity 2 above the water inlet 5. Accordingly, for stones having an approximate radius of 1 mm and weighing approximately 0.07 millinewtons (mN) in water, the critical velocity to propel the heavy debris upwards is 0.34 meters per second. For a stone particle having an approximate radius 3 mm and weighing approximately 2 mN in water, the critical velocity required to lift the stone upwards is 0.59 meters per second. For a stone having a 6 mm radius and a weight in water of approximately 15.98 mN, the critical velocity of water to lift the stone upwards through the cooling system 10 is 0.84 meters per second. The flow velocity 21 in the cavity 2 may be below one or all of these exemplary critical velocities. The particles having a critical velocity that is higher than the flow velocity 21 in the cavity 2 will fall, or sink, towards the lower side 17 of the cavity 2 of the filter 1. A person of ordinary skill in the art will understand in light of this disclosure that the critical velocity value will also vary depending on the orientation of the filter 1—i.e., the verticality of the flow path from the water inlet 5 to the water outlet 6—and the geometry of the cavity 2. The relationship between the critical velocity and the filter orientation is such that the critical velocity value increases as the filter 1 is oriented more horizontally. Likewise, the relationship between the critical velocity and the filter geometry is such that the critical velocity value will increase as the length and volume of the filter increases, and thus the time of the water in the filter cavity increases. In other words, a filter 1 with a longer length 51 having a cavity 2 with a higher volume will allow the filtration of the debris 30, 32 at a higher flow velocity 21 than an otherwise similar filter with a shorter length 51. Likewise, a minimum critical velocity for the flow velocity 21 may be determined based also on buoyant debris 32 desired to be filtered at the system, which a person having ordinary skill in the art will understand also varies with the orientation and geometry of the filter 1. Moreover, a person having ordinary skill in the art will understand in light of this disclosure that the flow velocity 21 inside the cavity 2 will vary depending on the heat load on the cooling system and the corresponding pump rate of the pump 3. It will be understood that the flow velocity 21 in the cavity 2 will be less when the engine is at idle conditions than when the engine is at steady state (e.g. cruising speed), which is less still than the peak flow velocity 21 reached during a period of marine vessel acceleration.

Figure 3:
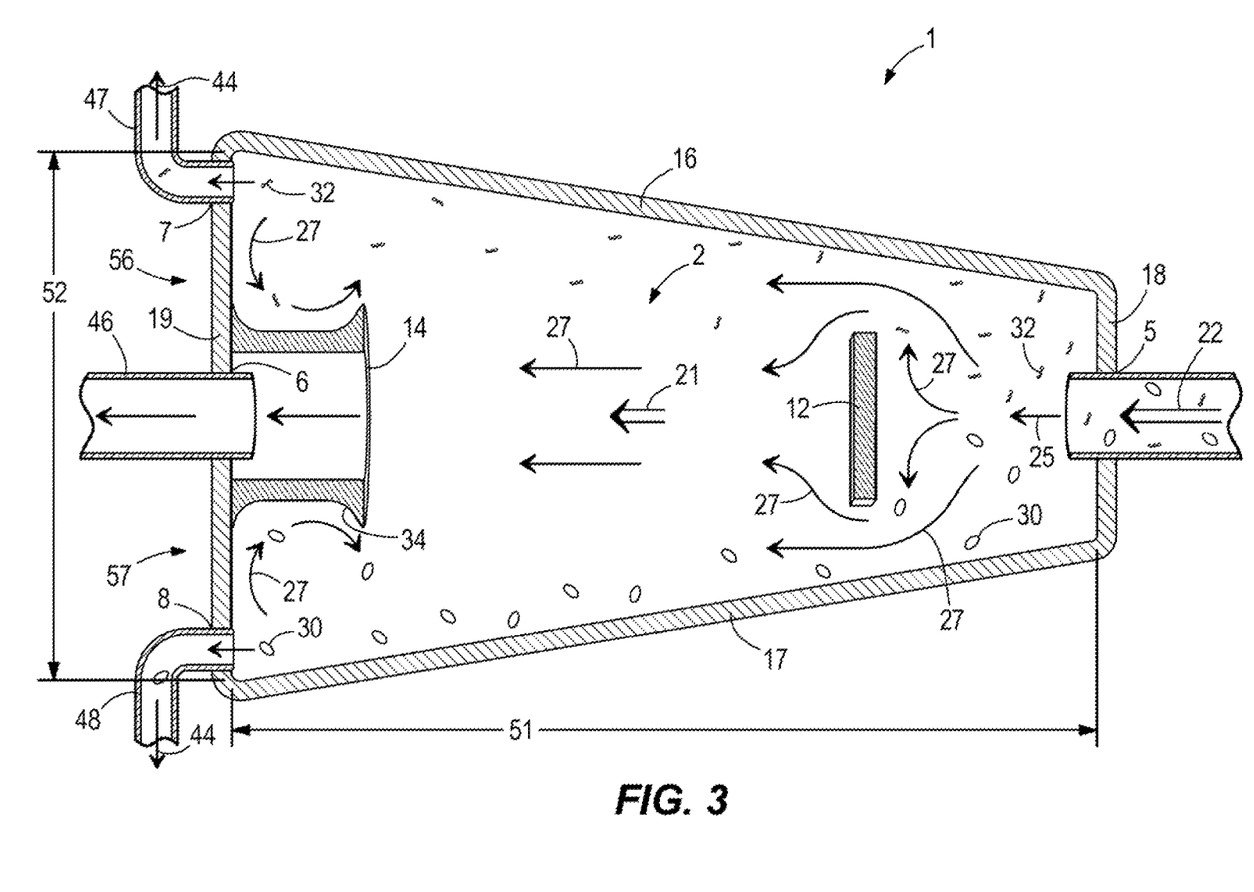
FIG. 3 depicts one embodiment of a filter for a water cooling system in a marine drive.

The filter cavity 2 may take on any shape that allows the expulsion of buoyant and heavy debris as described herein, and the cavity 2 may be oriented such that the water flows horizontally, vertically, and/or at any angle on the path from the water inlet 5 to the water outlet 6. FIGS. 3-7 depict a lengthwise cross-section between the water inlet 5 and the water outlet 6 of exemplary embodiments of debris filters 1. FIG. 3 depicts an embodiment of a filter 1 wherein the lengthwise cross-sectional area is shaped as an isosceles trapezoid having a first side 18 with the water inlet 5 that is shorter than a second side 19 having the water outlet 6. The first side 18 and the second side 19 are generally parallel and are connected by upper side 16 and lower side 17, which are sloped in equal and opposite directions. Specifically, the upper side 16 slopes upward from the first side 18 to the second side 19, and lower side 17 slopes downward from the first side 18 to the second side 19.

Figure 4:
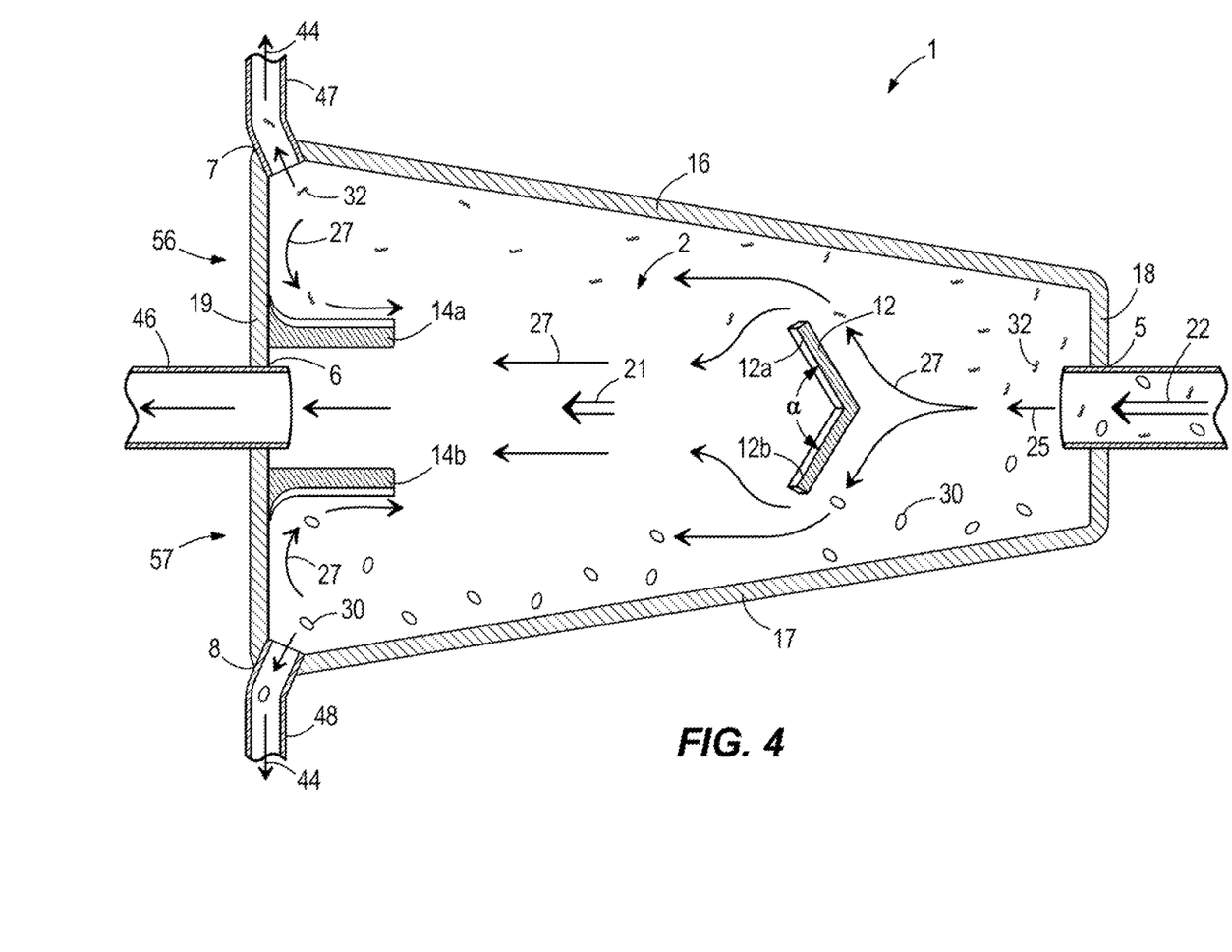
FIG. 4 depicts another embodiment of a filter for a water cooling system in a marine drive.

In the embodiment depicted in FIG. 3, the upper debris outlet 7 is on an upper portion 56 of the second side 19 above the water outlet 6. The lower debris outlet 8 is on a lower portion 57 of the second side 19 below the water outlet 6. Accordingly, the heavy debris 30 that sinks toward the lower side 17 travels through the lower portion 57 of the cavity and is forced out of the cavity 2 through the lower debris outlet 8. Similarly, the buoyant debris 32 floats toward the upper side 16 and travels through the upper portion 56 of the cavity 2 to be expelled out the upper debris outlet 8. In various embodiments, the upper debris outlet 7 and the lower debris outlet 8 may be positioned at various locations on the filter, such as at other locations on the second side 19, and on the upper and lower sides 16, 17, respectively. Other exemplary locations for the upper debris outlet 7 and the lower debris outlet 8 are exemplified in FIGS. 4 and 5, with FIG. 4 showing the debris outlets at each of the joints between the upper and lower sides 16, 17 and the second side 19.

The flow path 27 of water between the water inlet 5 and the water outlet 6 is devised in order to expel the heavy debris 30 out of the lower debris outlet 8 and the buoyant debris 32 out of the upper debris outlet 7. For example, an inlet flow flows into the filter cavity 2 through the inlet 5 at inlet flow velocity 22 in direction 25. The flow diverter 12 slows the inlet flow velocity 22 and changes the flow direction, forcing the water to travel in various flow directions 27 and paths through the cavity. Specifically, the flow diverter 12 forces water to travel upward and downward in the cavity 2, which assists in the debris collection and expulsion.

At the side of the water outlet 6, a debris deflector 14 may be positioned to block the entrance of debris 30, 32 that is not expelled out of debris outlet 7, 8 from entering the water outlet 6, and to force the water flow path 27 to carry any remaining debris swept toward the water outlet 6 back toward the respective debris outlet 7, 8. The debris outlet 14 may have a curved edge 34, or lip, designed to facilitate this flow path 27 and prevent any debris 30, 32 circulating near the second side 19 from getting sucked into the water outlet 6. The debris deflector 14 depicted in FIG. 3 extends from the second side 19 and surrounds the water outlet 6 so as to form a tube around the water outlet 6. In other embodiments, such as that depicted in FIG. 4, the debris deflector 14 may be a flat plate extending above and/or below the water outlet 6. In the embodiment of FIG. 4, an upper debris deflector 14a is a plate extending from the second side 19 above the water outlet 6, and a lower debris deflector 14b is a plate extending from the second side 19 below the water outlet 6. For example, the upper and lower debris deflectors 14a, 14b may extend across the depth 53 of the filter cavity 2.

Figure 5:
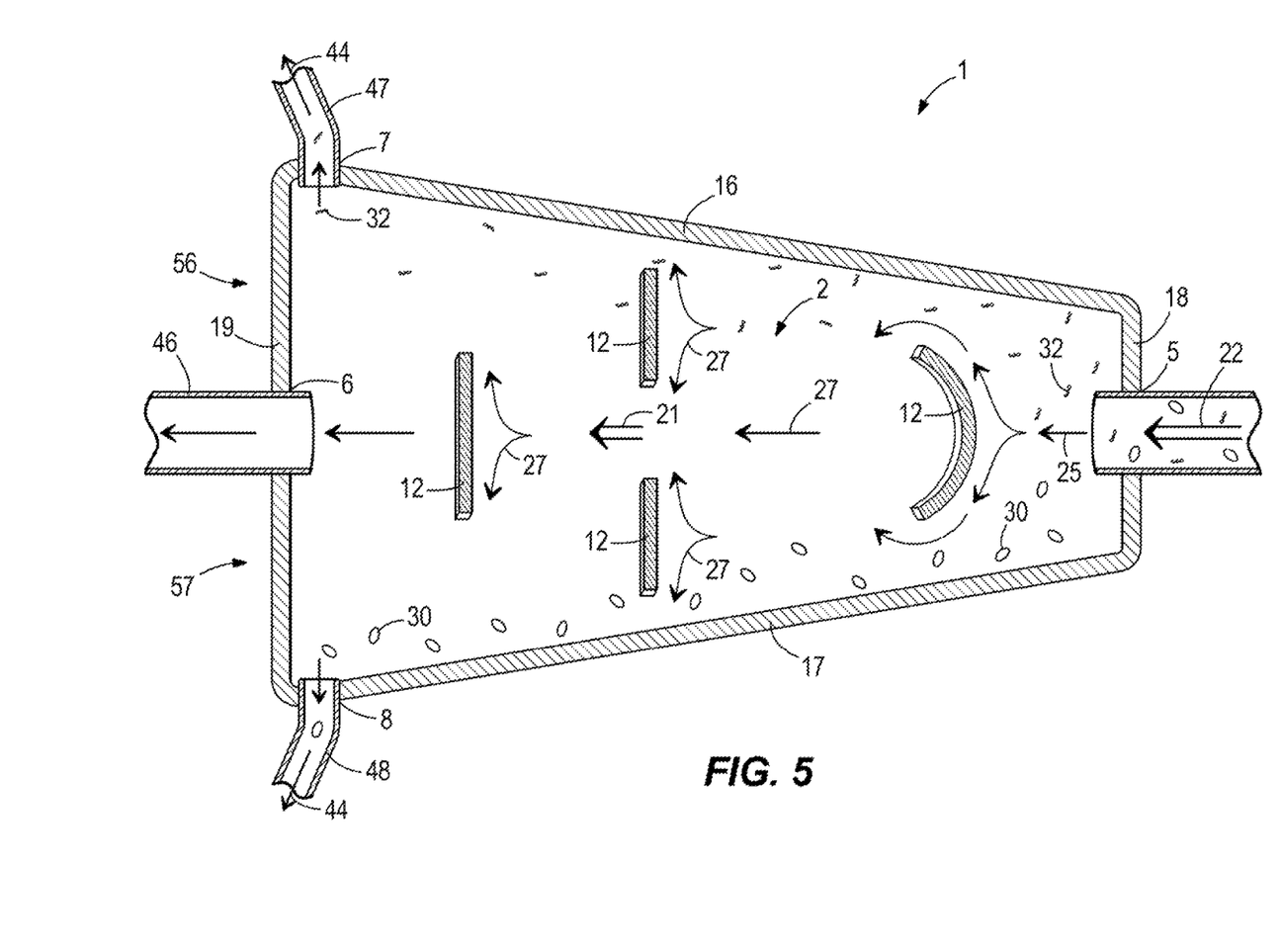
FIG. 5 depicts another embodiment of a filter for a water cooling system in a marine drive.

As described above, the flow diverter 12 may be placed at various locations within the filter cavity 2 in order to disperse the water flow between the water inlet 5 and the water outlet 6. In the embodiment of FIG. 3, the flow diverter 12 is a flat plate placed relatively close to the water inlet 5. For example, the flow diverter 12 may be placed at a distance from the water inlet 5 that is approximately ¼ to ⅓ the length 51 of the filter cavity 2. In other embodiments, such as that depicted in FIG. 4, the flow diverter 12 may be at a location closer to the lengthwise center of the filter cavity 2. Likewise, as depicted in FIG. 5, the flow diverter 12 may be placed relatively closer to the water inlet 5, such that the distance between the water inlet 5 and the flow diverter 12 is approximately ⅛ to ⅙ the length 51 of the filter cavity 2. The filter 1 may also comprise more than one flow diverter 12, which may be spaced the throughout the filter cavity 2 in order to disperse the flow of water through the cavity 2. In the embodiment depicted in FIG. 5, a flow diverter is positioned close to the water inlet 5, and three additional flow diverters 12 are positioned throughout the cavity 2. Notably, in the embodiment depicted in FIG. 5, the filter 1 does not have any debris deflectors 14; however, in other embodiments, debris deflectors may be utilized in addition to the multiple flow diverters 12.

Figure 6:
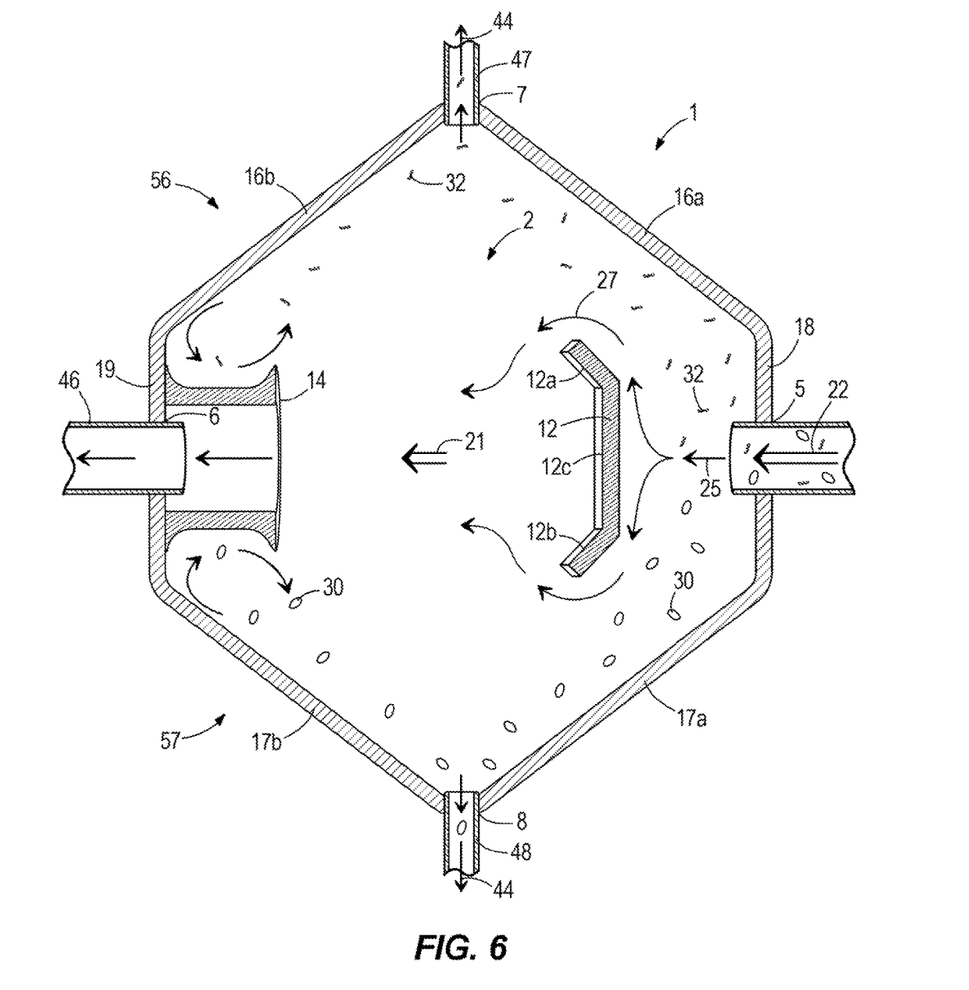
FIG. 6 depicts another embodiment of a filter for a water cooling system in a marine drive.

The flow diverter 12 may take any shape and/or size capable of adequately dispersing a water flow through the cavity 2. In the embodiment of FIG. 4, the debris deflector 12 is an angled plate with an upper side 12a and a lower side 12b that come together at angle α. Angle α may be any angle; however, at small angles α the flow diversion affect will be minimal. Likewise, the angle α may be greater than 180°, such that the angled plate creates a flow path 27 that directs water back toward the first side 18, which disperses the water flow from the water inlet 5 very effectively. In some embodiments, such as embodiments where the length 51 of the cavity 2 is relatively short, a flow diverter 12 angled back towards the first side 18 may provide superior performance. In other embodiments, the flow diverter 12 may be a curved plate, such as that depicted in FIG. 5. In still other embodiments, the flow diverter 12 may be a plate with several angles, such as that depicted in FIG. 6. In that embodiment, the flow diverter 12 has an upper side 12a and a lower side 12b that meet with a flat plate 12c. In the embodiment of FIG. 6, the upper side 12a and the lower side 12b of the flow diverter 12 run parallel with the upper side 16 and the lower side 17, respectively, of the filter cavity 2. However, in other embodiments, the upper side 12a and the lower side 12b may be at other angles and may not run parallel.

As described above, the filter cavity 2 may be any shape that allows the heavy debris 30 and buoyant debris 32 to be removed from the water flowing out the outlet 6. In the example of FIG. 6, the filter cavity 2 has a lengthwise cross-sectional area between the water inlet 5 and the water outlet 6 that is a hexagon. Specifically, the upper side 16 has two portions, 16a and 16b, that meet at a high point where the upper debris outlet 7 is located. Specifically, the portion 16a of the upper side that is closer to the water inlet 5 is sloped upward such that buoyant debris 32 entering the water inlet 5 floats upward toward the upper debris outlet 7. Likewise, the side 16b of the upper side closer to the water outlet 6 guides the debris coming off of the debris deflector 14 back upwards toward the upper debris outlet 7. Similarly, the lower side has two portions, 17a and 17b, that extend downward toward the heavy debris outlet 8 and guide the heavy debris 30 toward the lower debris outlet 8.

Figure 7:
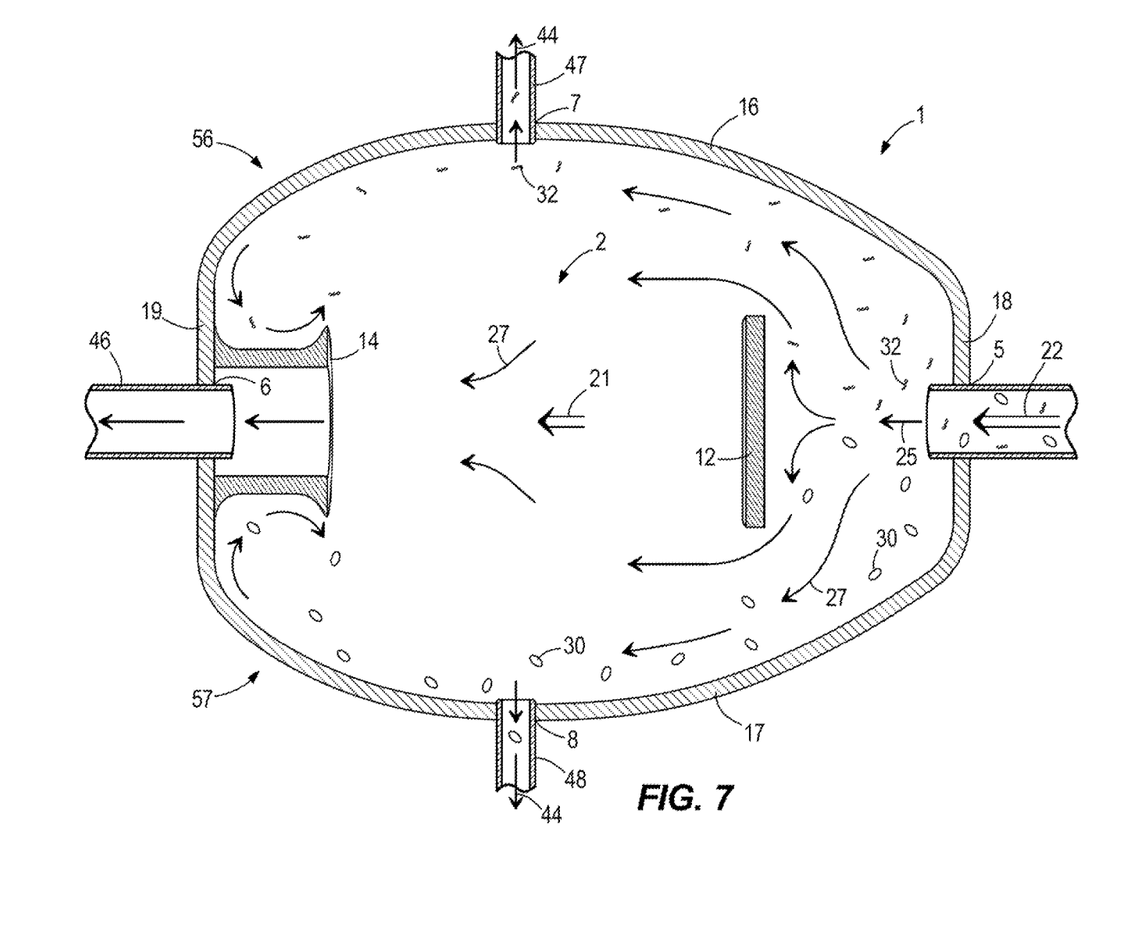
FIG. 7 depicts another embodiment of a filter for a water cooling system in a marine drive.

FIG. 7 depicts another embodiment that operates similarly, where the upper side 16 is sloped upward and the lower side 17 is sloped downward. In the embodiment of FIG. 7, the upper and lower sides, 16 and 17, are curved. The upper debris outlet 7 is at a high point on the curved upper side 16, and the lower debris outlet 8 is at a low point on the curved lower side 17. This feature is similar to other depicted embodiments and has the benefit that the debris outlets 7, 8 are positioned to capture the most debris, as buoyant debris 32 has a tendency to float to the highest point in the filter cavity 2 and the heavy debris 30 has a tendency to sink to the lowest point in the filter cavity 2. However, in other embodiments, the debris outlets 7, 8 may be placed in alternative locations, such as to conform to spacing requirements within the system.

FIGS. 3-7 generally depict filter geometries and configurations having the water inlet 5 in an opposing side of the filter from the water outlet 6. However, a person having ordinary skill in the art will understand in light of this disclosure that, in other embodiments the water inlet 5 may not be oriented on opposing sides. For example, the water inlet 5 may be in an adjoining side to the side containing the water outlet 6. In other embodiments, the water inlet 5 may be on the same side of the filter 1 as the water outlet 6, such as both on the upper side 16 or lower side 17. Such an embodiment may require that the flow path change flow direction by a total of 180 degrees within the filter cavity 2. In certain such embodiments, a flow diverter 12 may not be helpful or necessary to break up the flow path between the water inlet 5 and the water outlet 6, and thus may be excluded. For example, in one embodiment, a filter may have a water inlet 5 on a lower portion 57 of the first side 18 and a water outlet on an upper portion 56 of the first side 18. Optionally, such an embodiment may include a debris deflector 14 adjacent to the water outlet 6 to deflect debris entering the cavity 2 through the water inlet 5.

The filter 1 may be comprised of any material capable of providing the cavity 2 and geometrical features described herein. For example, the filter 1 may be constructed out of plastic, aluminum or other metal, etc.

This written description uses examples to disclose the invention, including the best mode, and also to enable any person skilled in the relevant art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A filter for a water cooling system in a marine drive housing, the filter comprising:
   a cavity having an upper side wall and a lower side wall;
   a water inlet that delivers an inlet flow into the cavity;
   a water outlet that delivers a filtered water flow out of the cavity;
   a flow diverter positioned to disperse the inlet flow between the water inlet and the water outlet so as to prevent any flow of water directly between the water inlet and the water outlet;
   wherein a flow velocity of water between the water inlet and the water outlet in the cavity is lower than a velocity of the inlet flow and a velocity of the filtered water flow such that heavy debris sinks toward the lower side wall of the cavity and buoyant debris floats toward the upper side wall of the cavity;
   an upper debris outlet that expels the buoyant debris out of the cavity;
   a lower debris outlet that expels the heavy debris out of the cavity; and
   wherein the filter is in the marine drive housing and configured to receive water from a water intake that intakes water from a body of water surrounding the marine drive housing and deliver a filtered water flow to a cooling water circuit that cools the engine.

2. The filter of claim 1, wherein the flow diverter is positioned adjacent to the water inlet.

3. The filter of claim 2, wherein the flow diverter is a flat plate.

4. The filter of claim 1, wherein the water inlet is in a first side wall of the cavity and the water outlet is in a second side wall of the cavity and further comprising a debris deflector on the second side wall adjacent to the water outlet and extending inward to the cavity from the second side wall.

5. The filter of claim 4, wherein the debris deflector surrounds the water outlet.

6. The filter of claim 1, wherein the water inlet is in a first side wall of the cavity and the water outlet is in a second side wall of the cavity, and the upper debris outlet is on an upper portion of the second side wall of the cavity and the lower debris outlet is on a lower portion of the second side wall of the cavity.

7. The filter of claim 1, wherein the upper debris outlet is on the upper side wall of the cavity and the lower debris outlet is on the lower side wall of the cavity.

8. The filter of claim 1, wherein at least a portion of the lower side wall of the cavity between the inlet and the lower debris outlet is sloped downward, or at least a portion of the upper side wall of the cavity between the inlet and the upper debris outlet is sloped upward.

9. The filter of claim 1, wherein the cavity has a lengthwise cross-sectional area between the water inlet and the water outlet that is shaped as an isosceles trapezoid.

10. The filter of claim 1, wherein the cavity has a lengthwise cross-sectional area between the water inlet and the water outlet that is shaped as a hexagon.

11. The filter of claim 1, wherein the at least one of the upper side wall and the lower side wall is curved.

12. The filter of claim 1, wherein the flow velocity of water in the cavity is below 0.34 meters per second when an engine cooled by the cooling system is at idle.

13. The filter of claim 1, wherein the water inlet and the water outlet are both in a first side wall of the cavity.

14. The filter of claim 1, wherein the filter is within one of a driveshaft housing, a gear case, or an engine housing in the marine drive housing.

15. A water cooling system for cooling an engine of a marine drive comprising:
    a water intake that intakes water from a body of water surrounding the marine drive;
    a cooling water circuit that cools the engine;
    a filter that filters water from the water intake and delivers a filtered water flow to the cooling circuit, the filter having:
       a cavity having an upper side wall and a lower side wall, a first side and a second side walls;
       a water inlet that delivers an inlet flow into the cavity;
       a water outlet that delivers the filtered water flow out of the cavity;
       a lower debris outlet in a lower portion of the cavity;
       an upper debris outlet in an upper portion of the cavity;
       a flow diverter positioned to disperse the inlet flow between the water inlet and the water outlet so as to prevent any flow of water directly between the water inlet and the water outlet;
    a pump connected in fluid communication with the water inlet or the water outlet that causes water to flow through the cavity of the filter from the water inlet to the water outlet at a flow velocity;
    wherein the flow velocity is lower than a velocity of the inlet flow and a velocity of the filtered water flow such that heavy debris in the inlet flow sinks toward the lower side wall of the cavity and is expelled out of the lower debris outlet and buoyant debris in the inlet flow floats toward the upper side wall of the cavity and is expelled out of the upper debris outlet.

16. The cooling system of claim 15, further comprising a debris deflector on the second side wall, adjacent to the water outlet and extending inward to the cavity.

17. The cooling system of claim 15, wherein the flow diverter is one of a flat plate, a curved plate, or an angled plate.

18. The cooling system of claim 15, wherein at least a portion of the lower side wall of the cavity between the inlet and the lower debris outlet is sloped downward and at least a portion of the upper side wall of the cavity between the inlet and the upper debris outlet is sloped upward.

19. The cooling system of claim 15, wherein at least one of the upper top side wall and the lower side wall is curved.

20. The cooling system of claim 15, wherein the filter is positioned in a driveshaft housing of the marine drive.

* * * * *

UNITED STATES PATENT AND TRADEMARK OFFICE
CERTIFICATE OF CORRECTION

| | |
|---|---|
| PATENT NO. | : 10,092,863 B1 |
| APPLICATION NO. | : 14/947369 |
| DATED | : October 9, 2018 |
| INVENTOR(S) | : Trevor George, Amir Abou-Zeid and Daniel Rothe |

It is certified that error appears in the above-identified patent and that said Letters Patent is hereby corrected as shown below:

In the Claims

In Claim 19, at Column 10, Line 61: "upper top side" should instead read --upper side--.

Signed and Sealed this
Sixth Day of November, 2018

Andrei Iancu
*Director of the United States Patent and Trademark Office*